March 12, 1963 R. H. MEINKEN 3,081,452

ENCODER

Filed Dec. 29, 1960 5 Sheets-Sheet 1

INVENTOR
R. H. MEINKEN
BY David P. Kelley
ATTORNEY

March 12, 1963 R. H. MEINKEN 3,081,452

ENCODER

Filed Dec. 29, 1960 5 Sheets-Sheet 2

INVENTOR
R. H. MEINKEN
BY David P. Kelley
ATTORNEY

INVENTOR
R. H. MEINKEN
BY David P. Kelley
ATTORNEY

March 12, 1963 R. H. MEINKEN 3,081,452

ENCODER

Filed Dec. 29, 1960 5 Sheets-Sheet 4

INVENTOR
R. H. MEINKEN
BY David P. Kelley
ATTORNEY

March 12, 1963 R. H. MEINKEN 3,081,452

ENCODER

Filed Dec. 29, 1960 5 Sheets-Sheet 5

INVENTOR
R. H. MEINKEN
BY David P. Kelley
ATTORNEY

United States Patent Office 3,081,452
Patented Mar. 12, 1963

3,081,452
ENCODER

Robert H. Meinken, Summit, N.J., assignor to Bell Telephone Laboratories, Incorporated, New York, N.Y., a corporation of New York Filed Dec. 29, 1960, Ser. No. 79,336
7 Claims. (Cl. 340—347)

This invention relates to encoding apparatus, and more particularly, it relates to encoding apparatus employing thin magnetic films and suitable for use in pulse code modulation systems.

In communication systems using pulse code modulation techniques, a message wave to be transmitted is sampled periodically and the amplitude of each sample is represented for transmission by a code analogous to telegraph codes. Generally, such codes are based on the permutation of a fixed number of elements or digits. For example, one permutation code frequently used in pulse code modulation is based on the binary number system. In any binary code each digit can have either of two values, which are most conveniently represented for transmission by "on" or "off" pulses, although pulses of two different finite amplitudes are sometimes employed.

Since the signal to be transmitted in a pulse code may be continuously variable and there are but a limited number of permutations in any code having a finite number of digits, only a quantized replica of the signal can be transmitted. In a system employing a pulse permutation code the amplitude range of the signal to be transmitted is divided into constituent amplitude ranges, each corresponding to a particular permutation of the digits in the code. Periodic samples of the signal wave are then compared with the quantized amplitude range to determine which of the constituent ranges most nearly represents the sample and the code group representing that range is transmitted.

It is apparent that the quality of the message transmitted through a pulse code modulation system is dependent on the accuracy and frequency with which the signal is sampled and encoded, as well as on the number of digits in the code. A successful high speed coding device known in the prior art is the electron beam "flash" coder which is described in United States Patent 2,516,752 to R. L. Carbrey. However, the electron beam tube devices heretofore employed as encoders are inherently limited by their size and structure to operation in relatively stable environments. Such devices comprise a number of mechanically delicate parts which must be maintained in precise alignment for proper functioning of the encoder. The mechanical tolerances necessary to achieve an acceptable accuracy in the encoding operation narrow considerably as the number of digits and speed of operation are increased. Such devices are difficult to assemble, expensive to manufacture, and in addition to being liable to breakage are adversely affected by mechanical shock as well as other environmental extremes.

An object of the present invention is to simplify and ruggedize the structure of coding apparatus for operation with a high degree of reliability under adverse conditions, and generally to improve the operation of pulse code modulation systems under such conditions.

A further object of the invention is the avoidence of difficulties heretofore encountered in the manufacture of known types of encoders.

Magnetic elements displaying substantially rectangular hysteresis characteristics have found wide application in electronics as substitutes for more expensive and less reliable components. The ability of such elements to remain in a particular state of magnetization to which driven by an applied magnetomotive force, and to switch from one to another stable state of magnetization, makes them particularly well suited for use in pulse circuits. Such elements are especially useful in circuits which perform operations on information represented in a binary number system. An advantageous form of magnetic element for these and other applications is the thin magnetic film, which is characterized by a very short switching time as well as being structurally well-adapted for inclusion in compact and rugged electronic devices. Fast-switching thin magnetic films are capable of operating at the speeds required in good quality pulse code modulation systems.

The intensity of the magnetic field required to switch a thin magnetic film depends, in general, on the nature of the material of which the film is composed; on the geometry of the film element, particularly its thickness; and on the ambient magnetic field acting on the element. Such parameters may be said to establish a "switching" or "bias" level for each film element, the term "bias" being used herein to designate the magnetic field strength which must be exceeded to switch an element from one magnetic state to another. According to the present invention, magnetic field pulses corresponding to sample values of a message wave are compared with predetermined bias levels in an array of thin magnetic film elements. When a sample pulse applied to an element exceeds the bias level of the element, switching occurs and a voltage pulse is produced in an output circuit in response to the change in magnetic flux.

It is a feature of the invention that an encoder for use in pulse code modulation systems comprises a plurality of differentially biased thin rectangular hysteresis loop magnetic films for producing pulse code groups in response to periodic amplitude samples of an analog signal.

In one illustrative embodiment of the invention an encoder for translating analog signals into an N-digit binary pulse permutation code comprises N groups of thin magnetic film elements characterized by substantially rectangular hysteresis loops. The magnetic elements in each group are differentially biased in accordance with the particular binary code, the bias levels in the $n$th digit group ($n=1, \ldots, N$) extending over a range $r_n=a_nR$ where R is the range from minimum to maximum of signal values to be encoded and $a_n$ is a proportionality constant. Means are provided in conjunction with each of the digit groups for applying to the magnetic elements thereof a pulsed magnetic drive field of a polarity which tends to switch said elements from one to another state of remnant magnetization. The magnitude of each drive pulse applied to the $n$th digit group exceeds the minimum of the bias range by an amount equal to $a_n$ times the magnitude of a sample value of the signal to be encoded. Means are also provided in conjunction with each digit group for applying to the magnetic elements thereof, during each drive pulse, a magnetic read pulse of opposite polarity to the drive pulse. The read pulse serves to compare the drive pulse with the bias levels in the array of elements by switching those magnetic elements with bias levels differing by less than a critical amount in magnitude from the drive pulse. Output pulses produced by the switching of magnetic elements in response to the read pulses are detected by means provided for that purpose in conjunction with each digit group.

In a second illustrative embodiment of the invention an encoder for translating analog signals into an N-digit binary code comprises N groups of thin rectangular hysteresis loop magnetic film elements. The magnetic elements are differentially biased in accordance with the particular binary code, the bias levels of the elements in each group, as in the first illustrative embodiment, extending over a range proportional to the range of signal values to be encoded. Means are provided in conjunction with each group for applying to the magnetic elements thereof a pulsed magnetic drive field, the excess of the drive pulses over the minimum of the bias range being proportional in magnitude to sample values of the signal to be encoded. Means are provided in conjunction with the individual magnetic elements in each digit group for detecting output pulses produced by the switching of elements in response to the drive pulses. However, the output means for elements at successive bias levels within each group are so coupled as to be 180 degrees out of phase. Thus a net output pulse is produced by a digit group when an odd number of elements is switched by the drive pulse, and no pulse is produced when an even number of elements is switched.

In general, an encoder of the type represented by the second embodiment comprises a greater number of magnetic elements than an equivalent device of the type represented by the first embodiment. However, the second type of encoder requires no read pulse, so that the additional complexity due to the greater number of magnetic elements is offset by the elimination of the read circuits. For this reason, also, the net power required for operation of the second type of encoder may be less than that required for operation of the first type.

The above-noted and other objects and features of the invention will be better and more fully understood from the following detailed description, taken in conjunction with the accompanying drawings in which.

The illustrative embodiments of the invention are depicted schematically in the mirror symbol notation familiar to workers in the magnetic core art. A description of mirror symbols may be found in an article by M. Karnaugh in Proceedings of the I.R.E., May 1955 at page 570. In the notation used herein, magnetic elements are indicated by double vertical lines, windings by short diagonal lines, and winding leads by horizontal lines. The direction of the magnetic flux produced by the current flowing through a winding may be ascertained by "reflecting" the current at the short diagonal line at the intersection of the lines representing the winding lead and the magnetic element.

Figure 1:
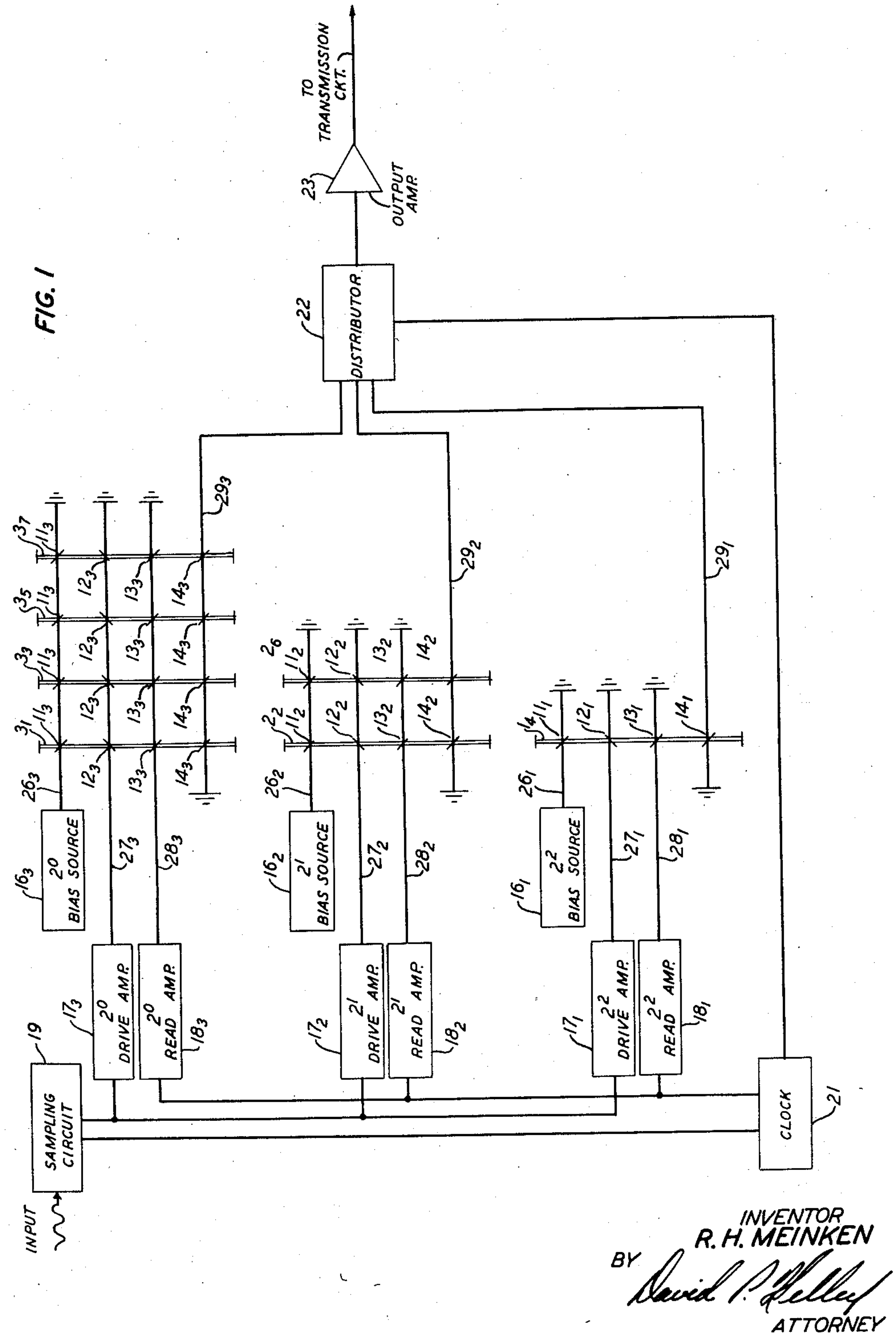
FIG. 1 depicts in schematic form an encoding system comprising a first illustrative embodiment of the invention.

In FIG. 1 there is depicted in schematic form an encoder for encoding analog signals in a three-digit simple binary code. The three binary digits are capable of encoding eight quantized signal levels as shown in Table I.

*Table I*

| Binary Digit | | | Quantized Signal Level |
|---|---|---|---|
| $2^2$ | $2^1$ | $2^0$ | |
| 0 | 0 | 0 | 1 |
| 0 | 0 | 1 | 2 |
| 0 | 1 | 0 | 3 |
| 0 | 1 | 1 | 4 |
| 1 | 0 | 0 | 5 |
| 1 | 0 | 1 | 6 |
| 1 | 1 | 0 | 7 |
| 1 | 1 | 1 | 8 |

The encoder comprises three digit groups of rectangular hysteresis loop thin magnetic film elements. The first digit group comprises magnetic element $\mathbf{1}_4$ which encodes the $2^2$ or "coarsest" binary digit. The second digit group comprises magnetic elements $\mathbf{2}_2$ and $\mathbf{2}_6$ which encode the $2^1$ or "middle" digit of the three digit binary code. The third digit group comprises magnetic elements $\mathbf{3}_1$, $\mathbf{3}_3$, $\mathbf{3}_5$ and $\mathbf{3}_7$ which encode the $2^0$ or finest digit of the code set forth in Table I. In general, the *n*th digit group comprises magnetic elements $n_i$ where the subscript denotes the bias level of the element as determined by the code.

Coupled to the elements $n_i$ are bias windings $\mathbf{11}_n$, drive windings $\mathbf{12}_n$, read windings $\mathbf{13}_n$ and output windings $\mathbf{14}_n$. The bias windings $\mathbf{11}_n$ are energized by current flowing from the bias source $\mathbf{16}_n$ through the leads $\mathbf{26}_n$. Drive amplifiers $\mathbf{17}_n$ are connected by leads $\mathbf{27}_n$ to drive windings $\mathbf{12}_n$, and read amplifiers $\mathbf{18}_n$ are connected by leads $\mathbf{28}_n$ to read windings $\mathbf{13}_n$. Output windings $\mathbf{14}_n$ are connected by leads $\mathbf{29}_n$ to distributor 22. As indicated by the mirror symbols in FIG. 1, bias windings $\mathbf{11}_n$ and read windings $\mathbf{13}_n$ when activated by currents flowing from left to right tend to magnetize the film elements $n_i$ in the same direction, which is opposite the direction of magnetization produced by such currents in drive windings $\mathbf{12}_n$.

Figure 2:
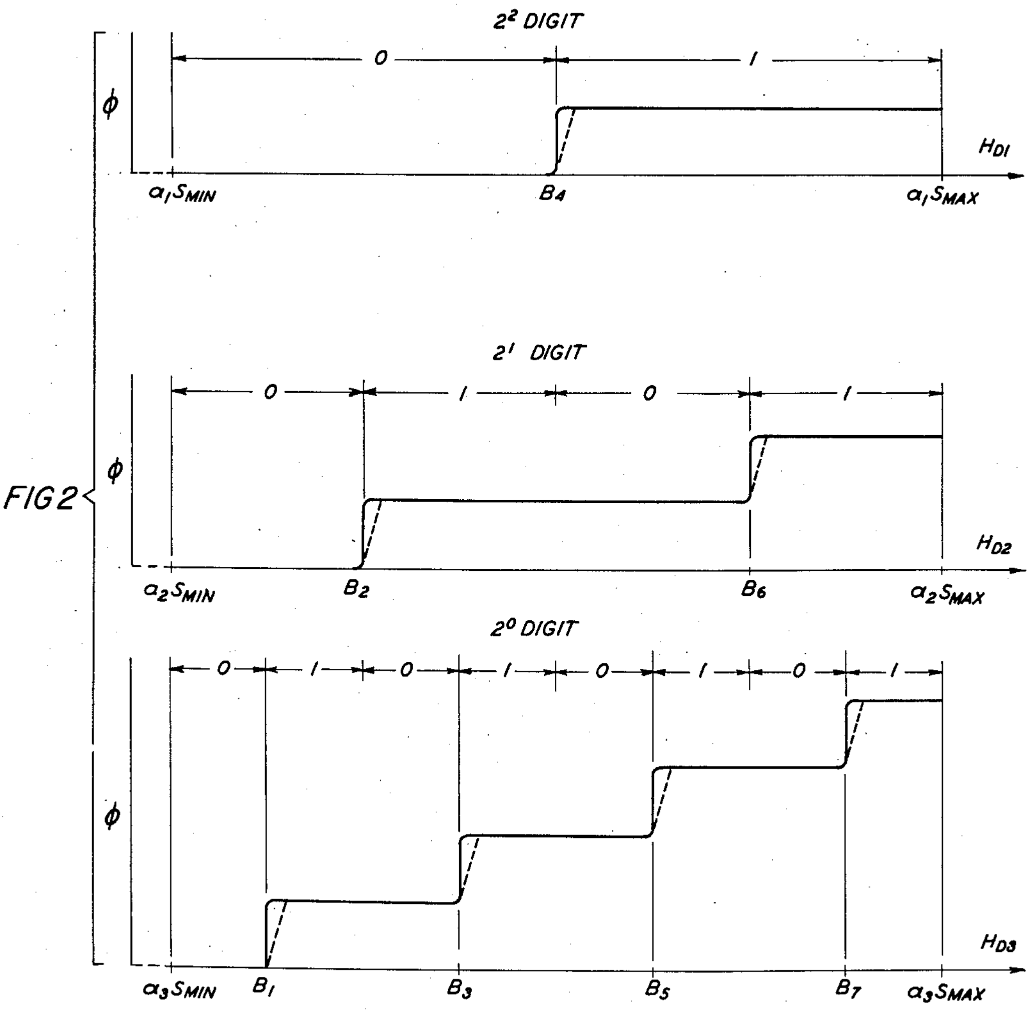
FIG. 2 is a plot of the flux linking the output circuit of the embodiment shown in FIG. 1, as a function of the drive field.

The magnetic elements $n_i$ in the illustrative embodiments shown in FIG. 1 are differentially biased in accordance with the binary code into which an analog input signal is to be translated. An idealized bias pattern corersponding to the code set forth in Table I is shown in FIG. 2, in which the total reversed flux $\Phi$ linking the output windings in each of the three digit groups is plotted as a function of the drive field $H_D$. The bias level or intensity of the drive field required to switch the element $n_i$ from one to another stable state of remnant magnetization is indicated by $B_i$.

The magnetic elements $\mathbf{3}_i$ in the $2^0$ digit group are differentially biased over a range $r_3=a_3R$ where $R=S_{max}-S_{min}$, the amplitude range of the signal to be encoded. The difference between successive bias levels in the $2^0$ digit group is advantageously equal to $\frac{1}{4}r_3$, while the differences between $a_3S_{min}$ and $B_1$, and between $a_3S_{max}$ and $B_7$ are equal to $\frac{1}{8}r_3$. The magnetic elements $\mathbf{2}_i$ in the $2^1$ digit group are differentially biased over a range $r_2=a_2R$. The difference between the two bias levels is equal to $\frac{1}{2}r_2$, while the differences $B_2-a_2S_{min}$ and $a_2S_{max}-B_6$ are equal to $\frac{1}{4}r_2$. The magnetic element $\mathbf{1}_4$ in the $2^2$ digit group is biased at an arbitrary level which may be considered to lie at the midpoint of a range $r_1=a_1R$.

In general an N digit encoder for translating analog signals into a simple binary code comprises N groups of $2^{n-1}$ magnetic elements each ($n=1, \ldots, N$). The elements in the *n*th group are biased over a range $$r_n=a_n(S_{max}-S_{min})$$

where S represents the magnitude of the signal to be encoded. Advantageously, the differences between successive bias levels in the *n*th digit group are substantially equal to a constant $D_n$ given by the relation $$D_n=\frac{a_n(S_{max}-S_{min})}{2^{n-1}}$$

In each digit group the differences between the highest bias level and $a_nS_{max}$, and between the lowest bias level and $a_nS_{min}$ are preferably equal.

In the operation of the encoder depicted in FIG. 1, an analog signal to be encoded is supplied to a sampling circuit 19 which is controlled by a clock 21. Periodic amplitude samples of the input signal are applied to the drive current amplifiers $\mathbf{17}_n$. Current pulses produced by the drive amplifiers $\mathbf{17}_n$ are transmitted through the drive windings $\mathbf{12}_n$ in the corresponding digit groups, the magnetic elements $n_i$ of which are thus subjected to magnetic field pulses which oppose the bias field produced by current flowing in the bias windings $\mathbf{11}_n$. A magnetic drive pulse which exceeds the bias level $B_n$ of a magnetic element $n_i$ will cause the element to switch from one magnetic state to another. Thus during the rise of the drive pulse a number of elements in the array may be switched, producing large pulses in the output windings $14_n$.

After the drive pulse has reached its full magnitude a magnetic read pulse is applied to the elements in each digit group. In the embodiment shown in FIG. 1, the read pulse is produced by current pulses from the read amplifiers $18_n$ under control of the clock 21. In an array of elements biased according to the pattern illustrated in FIG. 2, the read pulse is advantageously of a magnitude equal to $\frac{1}{2}D_n$, where $D_n$ is the difference between successive bias levels in the *n*th digit group. The read pulse compares the drive pulse to the bias levels of the elements in each digit group by resetting those elements biased at levels most nearly corresponding to the magnitude of the drive field which were set by the drive pulse. Thus, in the illustrative embodiment the *i*th element will be reset by the read pulse if $$0<H_d-B_i\leq\frac{D}{2}$$

The resetting of these elements produces abrupt changes in the flux linking the output windings $14_n$ and output pulses are detected in the output windings $14_n$ of the digit groups affected. The distributor circuit 100, controlled by clock 21, is gated on during the read pulses. Thus it separates the output pulses from the pulses produced during the rise time of the drive pulse and distributes them sequentially in time so that they may be transmitted over a single channel to output amplifier 23, and thence to a transmission circuit.

Figure 3:
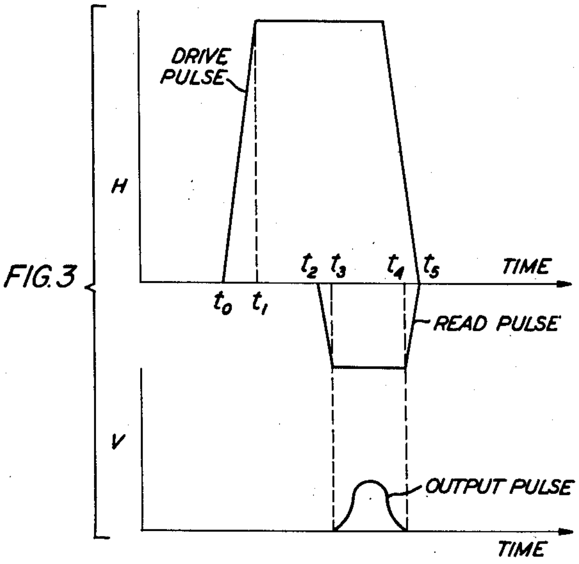
FIG. 3 illustrates a pulse sequence followed in the operation of one type of encoder embodying the principles of the invention.

The operation of encoding a single sampling pulse may be more easily understood with the aid of FIG. 3. The drive pulse, having an amplitude proportional to the magnitude of the signal sample, is applied to the array of magnetic elements at time $t_0$ and reaches its maximum at $t_1$. During the interval from $t_0$ to $t_1$ a number of elements in the array may switch as the rising drive field exceeds their bias levels. At $t_2$ a read pulse is applied to the array. The interval between $t_1$ and $t_2$ is sufficient to alow a substantially complete reversal of flux in those elements whose bias levels are exceeded by the drive pulse. At $t_3$ the read pulse reaches its maximum and the read-out time commences and runs till $t_4$. The distributor 22 in FIG. 1 would be gated on in this interval. At $t_5$ the read pulse decreases to zero and the drive pulse may take on a new value corresponding to the level of the next signal sample.

Figure 4:
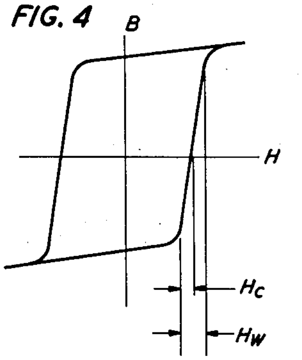
FIG. 4 is a hysteresis diagram of a typical material having a substantially rectangular loop.

In FIG. 2 the transitions in $\Phi(H_D)$ are shown as vertical lines. In actuality these transitions will have the form of the hysteresis loops characterizing the magnetic elements $n_i$. A typical hysteresis loop, shown in FIG. 4, may have transistions which depart somewhat from the vertical. In the idealized case the critical field $H_c$ required to switch a magnetic element is vanishingly small. The encoding operation is, however, substantially unchanged for $H_c>0$ provided only that the magnitude of the read pulse is increased by an amount $2H_c$. For an otherwise perfect encoder using magnetic elements with $H_c>0$, the difference between successive bias levels in the $2^0$ or "finest" digit should be at least $2H_w$ where $H_w$ is the width of the transition region as shown in FIG. 4. Closer spacing of bias levels adversely affects the accuracy or resolution of the encoder.

It is to be noted that even for "square loop" magnetic materials the switching time is strongly dependent on the excess field seen by the element. Generally, the switching time increases rapidly as the excess field is reduced to the lower limit $2H_c$. The rate at which the signal is to be sampled and encoded, as well as the number of digits in the code, affect the time available for switching the magnetic elements during each encoding cycle. The smaller the excess field acting on an element in the allotted time, the smaller the amount of flux that will be switched. The effect of this characteristic of magnetic materials on the function $\Phi(H_D)$ is shown by the dotted lines in FIG. 2. The instantaneous output voltage induced in the windings $14_n$ in FIG. 1 is also affected, since it varies approximately as $$\frac{\Delta\Phi}{t_s}$$

where $t_s$ is the switching time. For any given excess field the switching time is decreased if there is a small angle between the bias and the switching fields, i.e., between the bias and drive or read fields. This angle cannot be made too large without reducing the total flux change and hence the output voltage. Angles as large as 20°–30° are acceptable.

Figure 5:
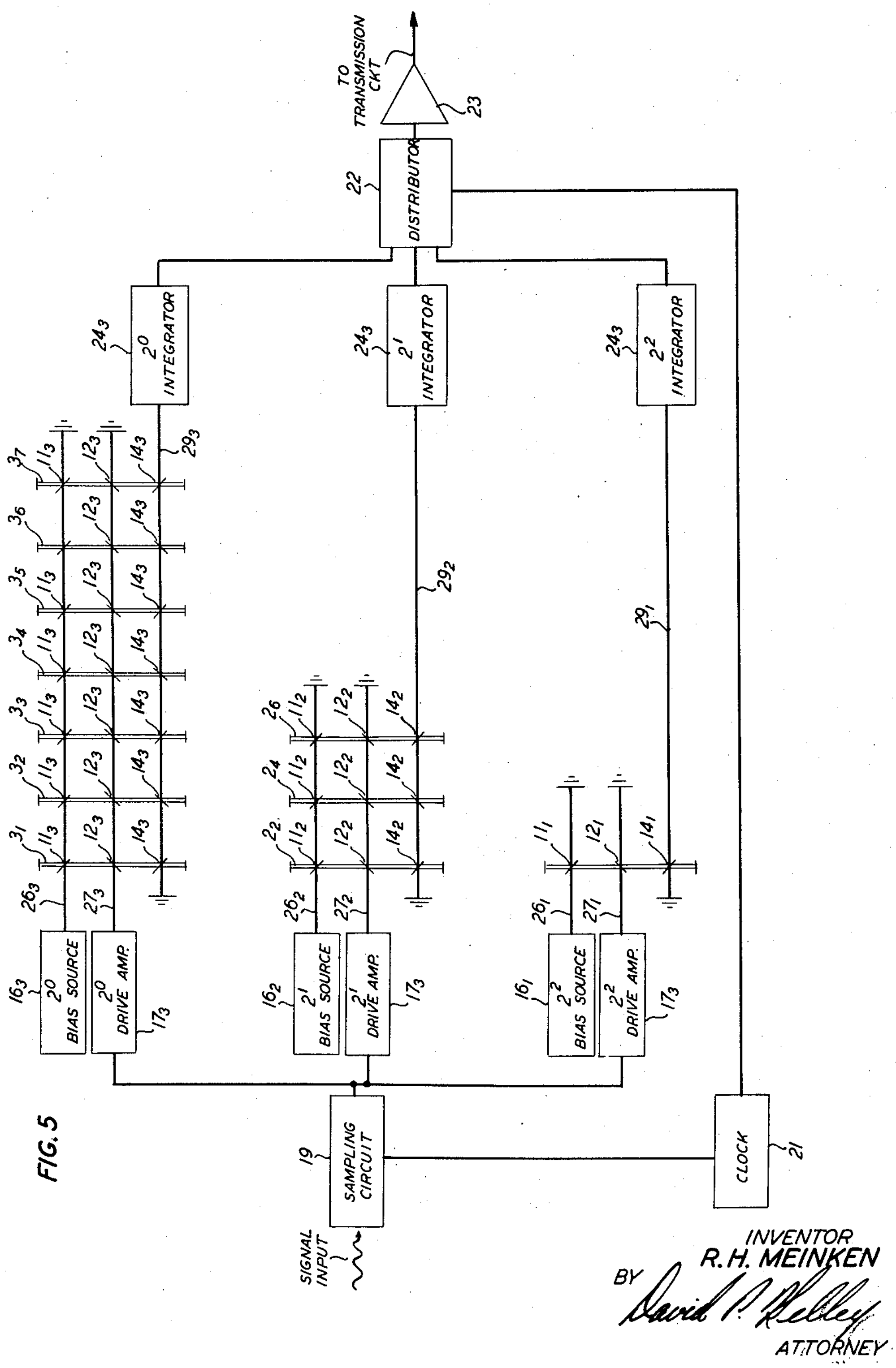
FIG. 5 depicts schematically an encoding system comprising a second illustrative embodiment of the invention.

In a second illustrative embodiment of the invention, depicted schematically in FIG. 5, a three digit encoder comprises three groups of differentially biased magnetic elements having the preferred hysteresis characteristics. The first group comprises magnetic element $1_4$ and encodes the $2^2$ digit of the binary code. The second group comprises elements $2_2$, $2_4$ and $2_6$, while the third group comprises elements $3_1$–$3_7$. In general the *n*th digit group comprises magnetic elements $n_i$ where the subscript, as in the previous illustration, indicates the bias level of the element as determined by the code.

As in the first embodiment, the magnetic elements $n_i$ in the *n*th group are linked by bias windings $11_n$ and drive windings $12_n$. Unlike the first embodiment, however, there are no read windings or read amplifiers in this second type of encoder. The read function is performed instead by the combination of the output windings $14_n$ and the integrator circuits $24_3$.

Figure 6:
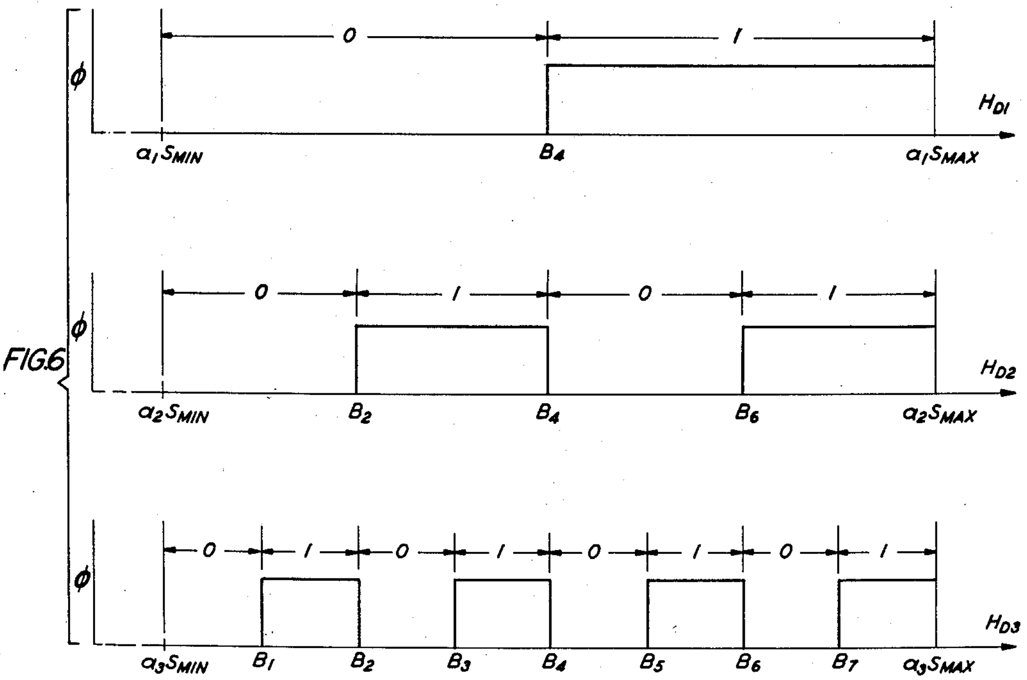
FIG. 6 is a slot of the output flux of the embodiment shown in FIG. 5, as a function of the drive field.

The output windings $14_n$ linking the magnetic elements $n_i$ in each digit group are coupled to the output leads $29_n$ so that pulses produced by elements at successive bias levels during the drive pulses are 180 degrees out of phase. Thus, there is a net output from integrator circuits $24_n$ when an odd number of elements in the *n*th digit group are switched by the drive pulse. In FIG. 6, the total reversed flux $\Phi$ linking the output windings $14_n$ in the three digit groups is plotted as a function of the drive field $H_D$. The bias levels in the pattern corresponding to the simple binary code in Table I are indicated by $B_i(i=1, \ldots, 7)$.

In general, an encoder of the second type for translating analog signals into an N-digit simple binary code comprises N groups of magnetic elements. The number of elements in the *n*th digit group $(n=1, \ldots, N)$ is $2^n-1$. The elements in the *n*th group are differentially biased over a range $r_n=a_nR$ where R is the range of signal values to be encoded and $a_n$ is a proportionality constant. The difference between successive bias levels in the *n*th digit group may advantageously be equal to a constant $D_n$ which in the pattern illustrated in FIG. 6 is given by the relation $$D_n=\frac{r_n}{2^n}$$

In accordance with the principles of the invention, high speed operation of a magnetic film binary encoder requires that the pulsed drive and read fields be characterized by very short rise times. This follows from the above-noted fact that the switching time of a magnetic element depends strongly on the excess field seen by it. It is a desideratum of this encoder that the largest possible amount of flux be switched in the shortest possible time, in order to increase the speed of operation and the amplitude of the output pulses. Transmission line circuits are particularly well adapted for applying fast rise time pulsed fields to linear arrays of thin film elements. The pictorial diagram in FIG. 7 shows a single digit group from an encoder embodying the principles of the invention, using a strip transmission line for applying the magnetic drive and read pulses.

Figure 7:
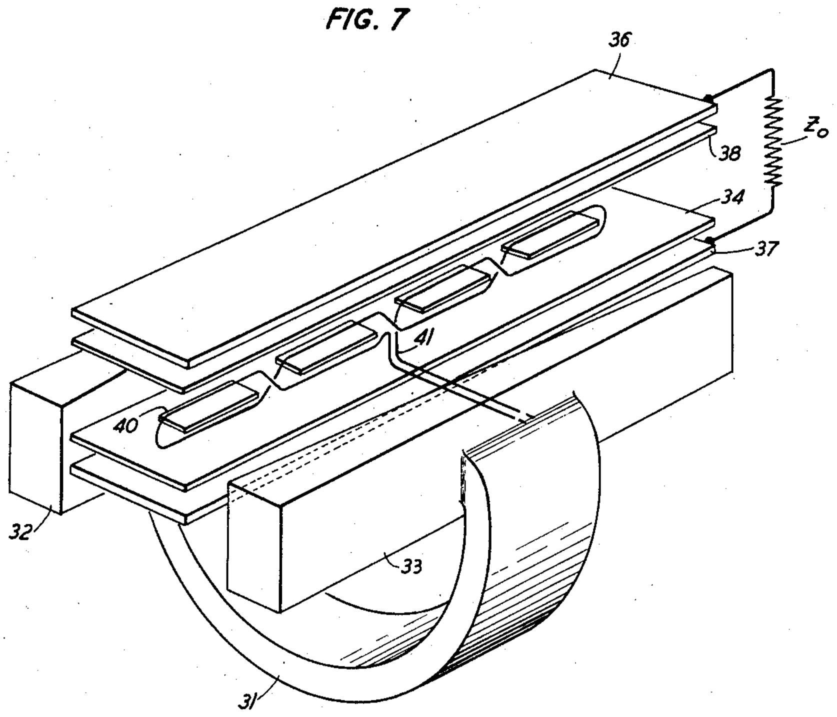
FIG. 7 illustrates the structure of a single digit group of a high speed encoder in accordance with the invention.

There is shown in FIG. 7 a single digit group comprising thin rectangular hysteresis loop magnetic film elements 40. The elements 40 are deposited on an insulating substrate 34 and are differentially biased by the graduated magnetic field provided by tapered pole pieces 32 and 33 of permanent magnet 31. The bias differential may be provided by magnet 31 alone or in combination with variations in the geometry and composition of the elements 40. The bias levels may be adjusted by varying the position of the elements 40 in the magnetic bias field. The pulsed magnetic drive field is applied to the array of elements 40 by means of a strip transmission line comprising conductive layers 36 and 37. The same strip line may be used to apply the pulsed read field in an encoder of the first type. To prevent undesirable reflections the strip line is terminated by its characteristic impedance $Z_0$. The magnetic elements 40 are electrically insulated from the conductive layers 36 and 37 by the substrate 34 and insulating layer 38. The magnetic elements 40 are linked by output winding 41 for detecting flux changes in response to the magnetic drive or read pulses.

As shown in FIG. 7, winding 41, which may be deposited on the substrate 34 by printed circuit techniques, is wound oppositely around adjacent magnetic elements 40 so that extraneous flux linkages may tend to cancel each other. This configuration, adopted to improve the accuracy of the encoder in which the magnetic film elements are closely spaced, results in output pulses of opposite polarity from adjacent elements. A simple rectifier may be used to obtain pulses of like polarity from all elements in the digit group.

Many alternative modes of practicing the invention will be apparent to those skilled in the art to which it pertains. For example, the bias range of the magnetic elements in the various digit groups may be adjusted so that the same proportionality constant $a_n$ applies to all groups. In that case, a single drive amplifier may be used instead of one for each digit group as shown in FIGS. 1 and 5. The foregoing, therefore, is to be construed by way of illustration and in no way limits the scope of the invention as defined in the claims:

What is claimed is:

1. Apparatus for encoding analog signals in an N-digit binary code, comprising N groups of differentially biased thin magnetic film elements characterized by substantially rectangular hysteresis loops, the elements in the $n$th group ($n=1, \ldots, N$) being differentially biased in accordance with said binary code over a range $r_n=a_nR$ where R is the range of signal values to be encoded and $a_n$ is a constant, means for applying to each of said groups of elements magnetic drive pulses of magnitude equal to $a_n$ times the magnitude of sample values of the signal to be encoded, and means for producing output pulses from said groups in combinations corresponding to quantized levels of the drive pulse.

2. Apparatus for encoding analog signals in an N-digit binary code, comprising N groups of $2^{n-1}$ ($n=1, \ldots, N$) differentially biased thin magnetic film elements characterized by substantially rectangular hysteresis loops, the differences between the bias levels of the elements in each of said groups being substantially equal to a constant $D_n$ given by the relation $$D_n=\frac{a_nR}{2^{n-1}}$$

where R is the range of signal values to be encoded expressed in magnetic field units and $a_n$ is a constant, means for applying to each of said groups of elements magnetic drive pulses of intensity equal to $a_n$ times the intensity of sample values of the signal to be encoded, means for applying to each of said groups of elements during the drive pulses magnetic read pulses of intensity equal to $\frac{1}{2}D_n$ and of polarity opposite that of the drive pulses, and means for detecting output pulses from each of said groups during said read pulses.

3. Apparatus for encoding analog signals in an N-digit binary code, comprising N groups of $2^{n-1}(n=1, \ldots, N)$ thin magnetic film elements characterized by substantially rectangular hysteresis loops, means for differentially biasing the elements in each of said groups, the differences between successive bias levels in each group being substantially equal to a constant $D_n$ given by the relation $$D_n=\frac{a_nR}{2^{n-1}}$$

where R is the range of signal values to be encoded expressed in magnetic field units, and $a_n$ is a proportionality constant, means for applying to each of said groups of elements a pulsed magnetic drive field equal to $a_n$ times the intensity of sample values of the signal to be encoded, means for applying to each of said groups of elements during the drive pulses magnetic read pulses of intensity equal to $\frac{1}{2}D_n$, and of polarity opposite that of the drive field, and means associated with each of said groups of elements for detecting output pulses during said read pulses.

4. Encoding apparatus as in claim 3 in which said biasing means comprises a permanent magnet having pole faces separated by a gap of uniformly varying width.

5. Apparatus for encoding analog signals in an N-digit binary code, comprising N groups of thin magnetic film elements characterized by substantially rectangular hysteresis loops, the elements in the $n$th group ( $n=1, \ldots, N$) being differentially biased in accordance with said binary code over a range $r_n=a_nR$ where R is the range of signal values to be encoded and $a_n$ is a constant, means for applying to each of said groups of elements magnetic drive pulses of magnitude equal to $a_n$ times the magnitude of sample values of the signal to be encoded, means for applying magnetic read pulses to each of said groups of elements during the drive pulses for switching the elements with bias levels most nearly equal in magnitude to said drive pulses, and means for detecting output pulses from each of said groups during said read pulses.

6. Apparatus for encoding analog signals in an N-digit binary code, comprising N groups of $2^{n-1}(n=1, \ldots, N)$ differentially biased thin magnetic film elements characterized by substantially rectangular hysteresis loops, the differences between the bias levels of the elements in each of said groups being substantially equal to a constant $D_n$ given by the relation $$D_n=\frac{a_nR}{2^n}$$

where R is the range of signal values to be encoded expressed in magnetic field units and $a_n$ is a proportionality constant, means for applying to each of said groups of elements magnetic drive pulses of magnitude equal to $a_n$ times the magnitude of sample values of the signal to be encoded, and means for detecting output pulses from each of said groups in which an odd number of said elements is switched by said drive pulses.

7. Apparatus for encoding analog signals in an N-digit binary code, comprising N groups of thin rectangular hysteresis loop magnetic film elements, said magnetic elements being differentially biased in accordance with said binary code, the bias levels of the elements in each group extending over a range proportional to the range of signal values to be encoded, means for applying to each of said groups of elements magnetic drive pulses of magnitude proportional to the magnitude of sample values of the signal to be encoded, means for detecting output pulses from each of said groups in response to said drive pulses, the coupling between said output detecting means and the magnetic elements at successive bias levels within each group being 180 degrees out of phase, whereby an output pulse is recorded from each group when an odd number of elements is switched by said drive pulse.

No references cited.